(12) United States Patent
Senda et al.

(10) Patent No.: US 10,686,624 B2
(45) Date of Patent: Jun. 16, 2020

(54) COMMUNICATION SYSTEM AND INFORMATION GENERATION METHOD FOR COMMUNICATION NETWORK

(71) Applicant: JTEKT CORPORATION, Osaka-shi (JP)

(72) Inventors: Terukazu Senda, Obu (JP); Satoshi Kato, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 467 days.

(21) Appl. No.: 15/344,956

(22) Filed: Nov. 7, 2016

(65) Prior Publication Data
US 2017/0141933 A1 May 18, 2017

(30) Foreign Application Priority Data

Nov. 13, 2015 (JP) .................. 2015-222712

(51) Int. Cl.
*H04L 12/417* (2006.01)
*H04L 12/26* (2006.01)
*H04L 12/24* (2006.01)

(52) U.S. Cl.
CPC ........ *H04L 12/417* (2013.01); *H04L 43/0811* (2013.01); *H04L 43/10* (2013.01); *H04L 41/0659* (2013.01); *H04L 41/0893* (2013.01); *H04L 41/12* (2013.01)

(58) Field of Classification Search
CPC ... H04L 12/417; H04L 43/0811; H04L 43/10; H04L 41/0659; H04L 41/0893; H04L 41/12
See application file for complete search history.

(56) References Cited

U.S. PATENT DOCUMENTS

| 4,949,337 A * | 8/1990 | Aggers | H04L 12/417 370/451 |
| 7,505,461 B2 * | 3/2009 | Matsuda | G06F 13/385 370/389 |
| 8,917,741 B2 * | 12/2014 | Beecroft | H04L 49/3045 370/414 |
| 9,049,097 B2 * | 6/2015 | Nakamura | H04L 12/4035 |
| 2004/0039958 A1 * | 2/2004 | Maxwell | H04M 3/30 714/47.2 |
| 2014/0336784 A1 * | 11/2014 | Senda | G05B 19/4185 700/7 |

FOREIGN PATENT DOCUMENTS

JP 2014-219774 11/2014

* cited by examiner

*Primary Examiner* — Philip J Chea
*Assistant Examiner* — Robert B McAdams
(74) *Attorney, Agent, or Firm* — Oblon, McClelland, Maier & Neustadt, L.L.P.

(57) ABSTRACT

A communication system includes: an information acquisition unit that acquires node information, which indicates the presence or absence of the execution of a reissuing process by communication processing nodes, for a plurality of switching processes in the case where a switching process has been executed once each for all of communication lines; and a system information generation unit that generates system information, which indicates the system of a communication network, on the basis of a plurality of pieces of node information that have been acquired.

20 Claims, 22 Drawing Sheets

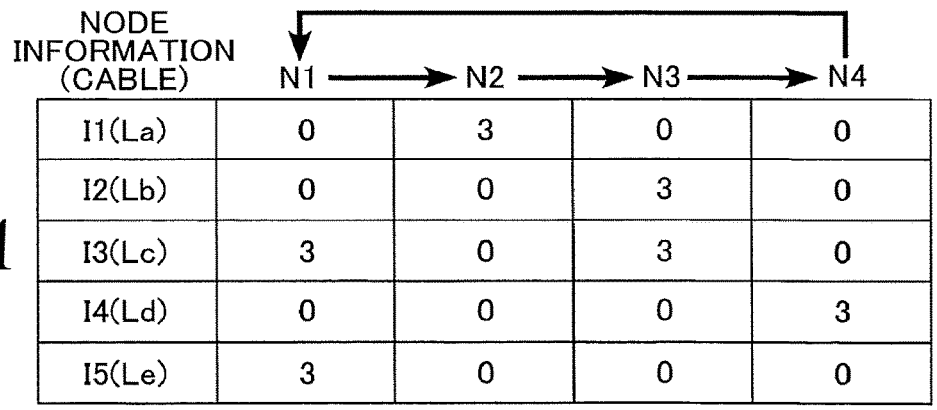
FIG.5A
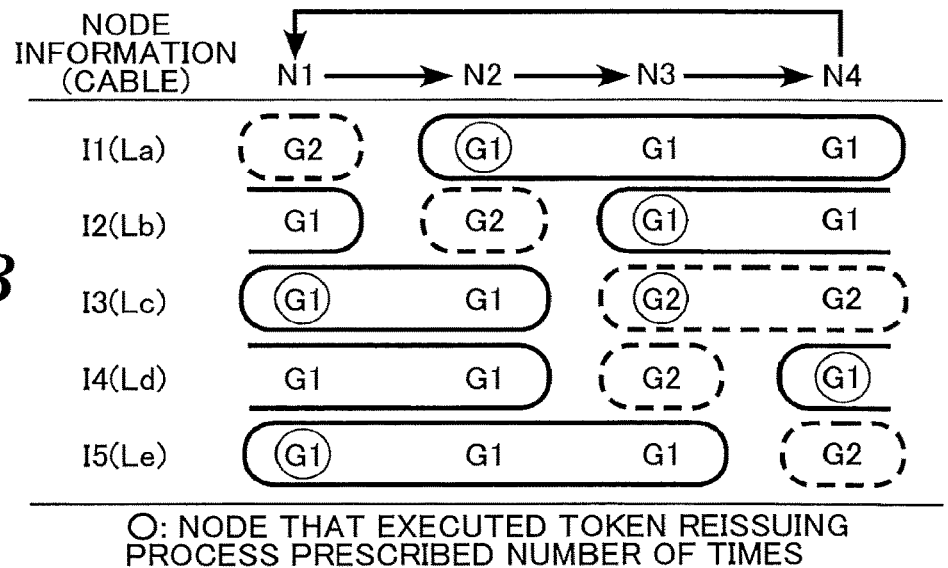
FIG.5B
○: NODE THAT EXECUTED TOKEN REISSUING PROCESS PRESCRIBED NUMBER OF TIMES
FIG.5C
| NODE INFORMATION (CABLE) | COMMUNICATION GROUP G1 | COMMUNICATION GROUP G2 |
|---|---|---|
| I1(La) | (N2) N3 N4 | N1 |
| I2(Lb) | N1 (N3) N4 | N2 |
| I3(Lc) | (N1) N2 | (N3) N4 |
| I4(Ld) | N1 N2 (N4) | N3 |
| I5(Le) | (N1) N2 N3 | N4 |
○: NODE THAT EXECUTED TOKEN REISSUING PROCESS PRESCRIBED NUMBER OF TIMES

FIG. 8

| SYSTEM INFORMATION ON COMMUNICATION NETWORK | | |
|---|---|---|
| HUB H1 | COMMUNICATION PROCESSING NODE | : N1, N2 |
| | OTHER HUBS : H2 | |
| HUB H2 | COMMUNICATION PROCESSING NODE | : N3, N4 |
| | OTHER HUBS : H1 | |

FIG. 10A

| NODE INFORMATION (CABLE) | N1 | N2 | N3 | N4 | N5 | N6 | N7 |
|---|---|---|---|---|---|---|---|
| I1(La) | 0 | 3 | 0 | 0 | 0 | 0 | 0 |
| I2(Lb) | 0 | 0 | 3 | 0 | 0 | 0 | 0 |
| I3(Lc) | 3 | 0 | 3 | 0 | 0 | 0 | 0 |
| I4(Ld) | 0 | 0 | 0 | 3 | 0 | 0 | 0 |
| I5(Le) | 0 | 0 | 0 | 3 | 0 | 3 | 0 |
| I6(Lf) | 3 | 0 | 0 | 0 | 0 | 3 | 0 |
| I7(Lg) | 0 | 0 | 0 | 0 | 3 | 0 | 0 |
| I8(Lh) | 0 | 0 | 0 | 0 | 0 | 3 | 0 |
| I9(Li) | 0 | 0 | 0 | 0 | 0 | 0 | 3 |
| I10(Lj) | 3 | 0 | 0 | 0 | 0 | 0 | 0 |

FIG. 10C

| NODE INFORMATION (CABLE) | COMMUNICATION GROUP G1 | COMMUNICATION GROUP G2 |
|---|---|---|
| I1(La) | (N2) N3 N4 N5 N6 N7 | N1 |
| I2(Lb) | N1 (N3) N4 N5 N6 N7 | N2 |
| I3(Lc) | (N1) N2 | (N3) N4 N5 N6 N7 |
| I4(Ld) | N1 N2 (N4) N5 N6 N7 | N3 |
| I5(Le) | (N4) N5 | N1 N2 N3 (N6) N7 |
| I6(Lf) | (N1) N2 N3 N4 N5 | (N6) N7 |
| I7(Lg) | N1 N2 N3 (N5) N6 N7 | N4 |
| I8(Lh) | N1 N2 N3 N4 (N6) N7 | N5 |
| I9(Li) | N1 N2 N3 N4 N5 (N7) | N6 |
| I10(Lj) | (N1) N2 N3 N4 N5 N6 | N7 |

○: NODE THAT EXECUTED TOKEN REISSUING PROCESS PRESCRIBED NUMBER OF TIMES

FIG. 12A

| NODE INFORMATION (CABLE) | Nmin → | ··· → | Ns → | N(s+1) → | ··· → | Nmax |
|---|---|---|---|---|---|---|
| ⋮ | ⋮ | | ⋮ | ⋮ | | ⋮ |
| Ik(Lk) | 0 | ····· | 0 | 3 | 0 | ····· |
| Il(Ll) | 0 | ····· | 0 | 3 | 0 | ····· |
| ⋮ | ⋮ | | ⋮ | ⋮ | | ⋮ |

FIG. 12B

| NODE INFORMATION (CABLE) | Nmin → ··· → Ns → N(s+1) → ··· → Nmax |
|---|---|
| ⋮ ⋮ ⋮ | |
| Ik(Lk) | G1 ······ ) ( G2 ) ( Ⓖ1 ) ······ |
| Il(Ll) | G1 ······ ) ( G2 ) ( Ⓖ1 ) ······ |
| ⋮ ⋮ ⋮ | |

○: NODE THAT EXECUTED TOKEN REISSUING PROCESS PRESCRIBED NUMBER OF TIMES

FIG. 20A

MANAGEMENT TABLE[N1,TIME T0]

| NODE NUMBER | PARTICIPATION STATE |
|---|---|
| 1 | ○ |
| 2 | ○ |
| 3 | ○ |
| 4 | ○ |

MANAGEMENT TABLE[N1,TIME Ta]

| NODE NUMBER | PARTICIPATION STATE |
|---|---|
| 1 | × |
| 2 | × |
| 3 | × |
| 4 | × |

MANAGEMENT TABLE[N1,TIME Tb]

| NODE NUMBER | PARTICIPATION STATE |
|---|---|
| 1 | ○ |
| 2 | × |
| 3 | ○ |
| 4 | ○ |

MANAGEMENT TABLE[N1,TIME Tc]

| NODE NUMBER | PARTICIPATION STATE |
|---|---|
| 1 | ○ |
| 2 | ○ |
| 3 | × |
| 4 | × |

MANAGEMENT TABLE[N1,TIME Td]

| NODE NUMBER | PARTICIPATION STATE |
|---|---|
| 1 | ○ |
| 2 | ○ |
| 3 | × |
| 4 | ○ |

MANAGEMENT TABLE[N1,TIME Te]

| NODE NUMBER | PARTICIPATION STATE |
|---|---|
| 1 | ○ |
| 2 | ○ |
| 3 | ○ |
| 4 | × |

FIG. 20B

| TIME | N1 | N2 | N3 | N4 | STATE OF COMMUNICATION NETWORK |
|---|---|---|---|---|---|
| T0 | ○ | ○ | ○ | ○ | NORMAL (NO REMOVAL) |
| Ta | × | × | × | × | NODE N1 REMOVED |
| Tb | ○ | × | ○ | ○ | NODE N2 REMOVED |
| Tc | ○ | ○ | × | × | NODES N3 AND N4 REMOVED |
| Td | ○ | ○ | × | ○ | NODE N3 REMOVED |
| Te | ○ | ○ | ○ | × | NODE N4 REMOVED |

COMMUNICATION SYSTEM AND INFORMATION GENERATION METHOD FOR COMMUNICATION NETWORK

INCORPORATION BY REFERENCE

The disclosure of Japanese Patent Application No. 2015-222712 filed on Nov. 13, 2015 including the specification, drawings and abstract, is incorporated herein by reference in its entirety.

BACKGROUND OF THE INVENTION

1. Field of the Invention

The present invention relates to a communication system and an information generation method for a communication network.

2. Description of the Related Art

As disclosed in Japanese Patent Application Publication No. 2014-219774, for example, a communication network is constructed by connecting processing devices such as programmable logic controllers (hereinafter referred to as "PLCs") to each other via communication lines and relay devices so that the processing devices can communicate with each other. In a communication network for communication through a token passing method, the number of processing devices can be increased and decreased in accordance with the usage and the purpose, and the system of the communication network is changed along with the increase or the decrease in number of processing devices.

System information such as a system diagram that indicates the system of the communication network is used to maintain or check the communication network described above. However, if there occurs a difference between the actual system of the communication network and the system diagram for management due to an increase or a decrease in number of processing devices, for example, the communication network may not be maintained or checked appropriately.

SUMMARY OF THE INVENTION

The present invention has an object to provide a communication system and an information generation method for a communication network capable of generating system information on a communication network.

An aspect of the present invention provides a communication system constituted of a communication network that enables three or more communication processing nodes to communicate with each other through a token passing method. The communication processing nodes are connected so as to be able to communicate with each other via two or more relay devices and two or more communication lines, and are each configured such that the communication processing node executes a reissuing process, in which a token is reissued for the following one of the communication processing nodes, in the case where one of the communication lines is brought into a disconnected state and a token is not received from the preceding one of the communication processing nodes. The communication system includes: an information acquisition unit configured such that, in the case where a switching process in which only one of the communication lines is switched to the disconnected state has been executed once each for all of the communication lines, the information acquisition unit acquires node information that indicates whether or not the reissuing process is executed by each of the communication processing nodes for each of a plurality of switching processes; and a system information generation unit configured to generate system information that indicates a system of the communication network on the basis of a plurality of pieces of the node information that have been acquired.

With the communication system according to the aspect, it is possible to calculate the number of the relay devices and the communication lines that constitute the current communication network and the relationship of connection between the communication processing nodes and the relay devices. This makes it possible to accurately generate system information that indicates the system of the communication network. Consequently, it is possible to improve the efficiency of the work for generating system information compared to the work for generating system information by following the communication lines of the actual communication network, for example. Hence, even in the case of a change in configuration of the communication network such as an increase or a decrease in number of processing devices that are communication processing nodes, for example, system information after the change can be acquired easily. In addition, acquisition of the system information can aid appropriate maintenance or check of the communication network.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A illustrates node information for each switching process in the configuration of FIG. 2;

FIG. 5B illustrates a state in which communication processing nodes are grouped into two communication groups in correspondence with the node information of FIG. 5A;

FIG. 5C illustrates the communication processing nodes divided in correspondence with the two communication groups of FIG. 5B;

FIG. 8 illustrates the system information in a table form;

FIG. 10A illustrates node information for each switching process in the configuration of FIG. 9;

FIG. 10C illustrates the communication processing nodes divided in correspondence with the two communication groups of FIG. 10B;

FIG. 12A illustrates a part of node information for each switching process in the configuration of FIG. 11;

FIG. 12B illustrates a state in which communication processing nodes are grouped into two communication groups in correspondence with the node information of FIG. 12A;

FIG. 20A illustrates a management table for a communication processing node N1 at each time corresponding to the switching process in the configuration of FIG. 2;

FIG. 20B is a table illustrating the relationship between each management table and the state of the communication network.

DETAILED DESCRIPTION OF EMBODIMENTS

Figure 1:
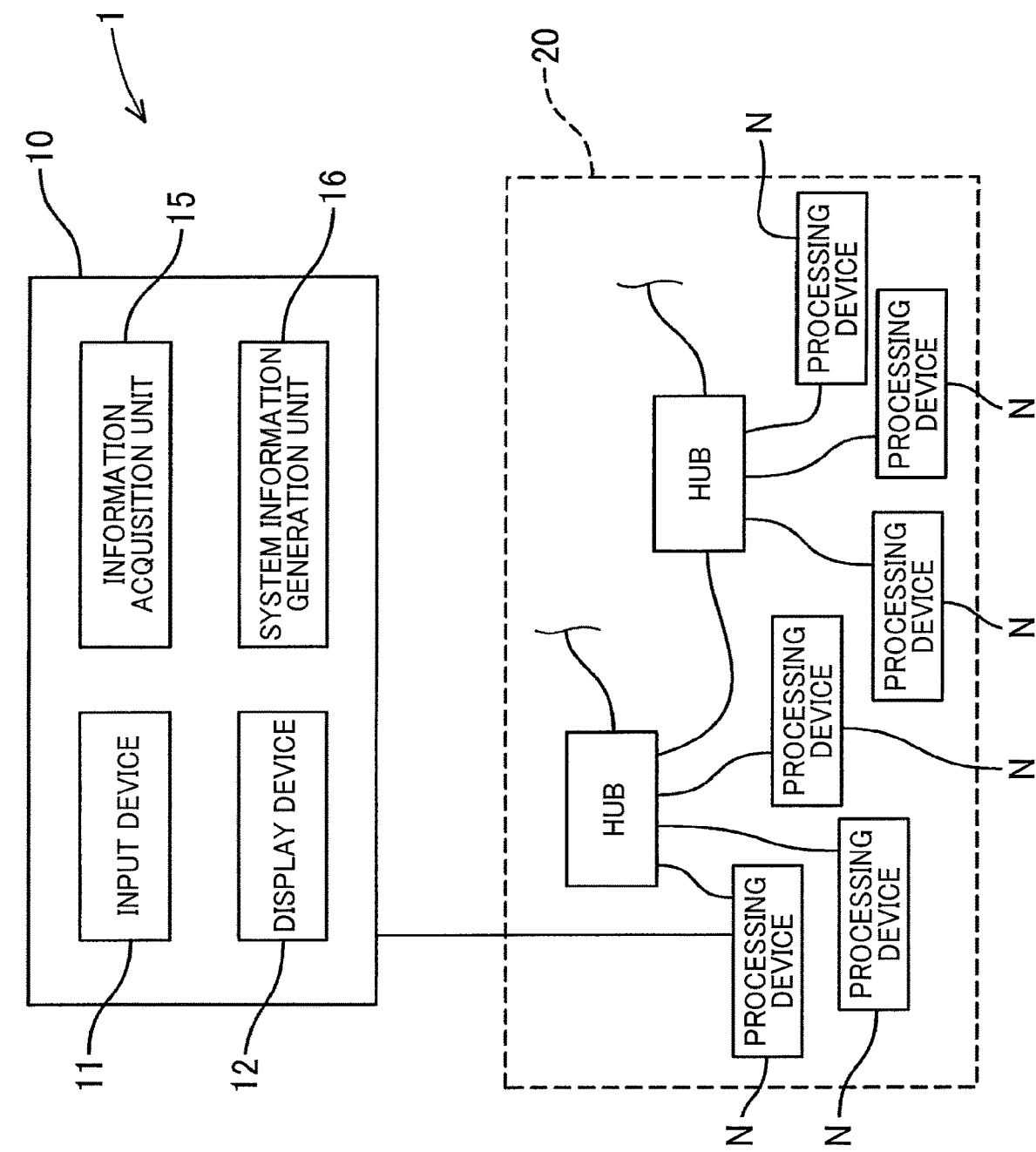
FIG. 1 illustrates the overall configuration of a communication system according to an embodiment.

The overall configuration of a communication system 1 that includes a communication network according to an embodiment will be described with reference to FIG. 1. The communication system 1 communicates with other processing devices N such as programmable logic controllers (hereinafter referred to as "PLCs") that control machine tools, industrial robots, and so forth. As illustrated in FIG. 1, the communication system 1 includes a host computer 10 and a communication network 20.

The host computer 10 monitors the operating status of the processing devices N, and performs various types of control. The host computer 10 has an input device 11, a display device 12, an information acquisition unit 15, and a system information generation unit 16. The input device 11 is used to input a parameter to the processing devices N such as PLCs, for example. The display device 12 displays information related to the processing devices N, for example. The processing devices N correspond to communication processing nodes that constitute the communication network 20. Hereinafter, the processing devices N will be referred to as "communication processing nodes N". The information acquisition unit 15 and the system information generation unit 16 execute a generation process for system information on the communication network 20 that constitutes the communication system 1. The information acquisition unit 15 and the system information generation unit 16 will be described in detail in relation to the system information generation process.

The communication network 20 is a network that enables three or more communication processing nodes N to communicate with each other through a token passing method. In the embodiment, the communication processing nodes N are connected so as to be able to communicate with each other through the communication network 20. In the communication network 20, the communication processing nodes N communicate with each other while transferring a transmission right (token) in a determined order. In the embodiment, the communication network 20 is an FL-net.

The communication network 20 is connected so as to be able to communicate with the host computer 10. In the embodiment, the host computer 10 and the communication network 20 are configured such that some or all of the communication processing nodes N can communicate with the host computer 10 through any communication method. The host computer 10 and the communication network 20 may be configured such that the host computer 10 communicates through a token passing method as one of the communication processing nodes N in the communication network 20.

The communication processing nodes N in the communication network 20 are connected so as to be able to communicate with each other via two or more relay devices and two or more communication lines. In addition, the communication processing nodes N each have a function of executing a reissuing process, in which a token is reissued for the following one of the communication processing nodes N, in the case where one of the communication lines is brought into a disconnected state and a token is not received from the preceding one of the communication processing nodes N.

Each of the communication processing nodes N transmits the result of computation performed by the communication processing node N itself or information on the state of the device to another communication processing node N. The state information includes information that indicates the communication processing node N that can communicate. Consequently, each of the communication processing nodes N can recognize the other communication processing nodes N that participate in the communication network 20. Whether or not the communication processing node N can communicate can be switched in accordance with the state of a power source for the processing device as the communication processing node or the state of connection of the communication line, for example. In the communication network 20 that is an FL-net, the device state information is shared using a management table attached to a frame (hereinafter referred to as a "token frame") that includes a token, for example.

In the case where the communication network 20 that is an FL-net is additionally provided with processing devices as the communication processing nodes N, the processing devices are enabled to participate in the communication as the communication processing nodes N. In the case where a part of the communication lines is brought into the disconnected state or the processing devices are turned off in the communication network 20, meanwhile, the processing devices (communication processing nodes N) can be removed from the communication. When the communication processing nodes N are added and removed in this way, the management table that indicates the communication processing nodes N that participate in the communication network 20 is updated by the token reissuing process and transmission and reception of the token.

In the FL-net, the token is distributed through broadcasting, and the communication processing nodes N that are not related to the transfer of the token also receive the token transmitted by another communication processing node N. Consequently, each of the communication processing nodes N can recognize the state of participation of the other nodes in the communication network 20 through the management table for the token frame.

For example, the communication processing node N updates the management table, in the case where a different communication processing node N does not transmit the token a prescribed number of times, considering that the different communication processing node N has been removed from the communication network 20. Meanwhile, the communication processing node N updates the management table, in the case where the token is not transmitted from all of the communication processing nodes N excluding the communication processing node N itself, considering that the communication processing node N itself has been removed from the communication network 20.

Figure 2:
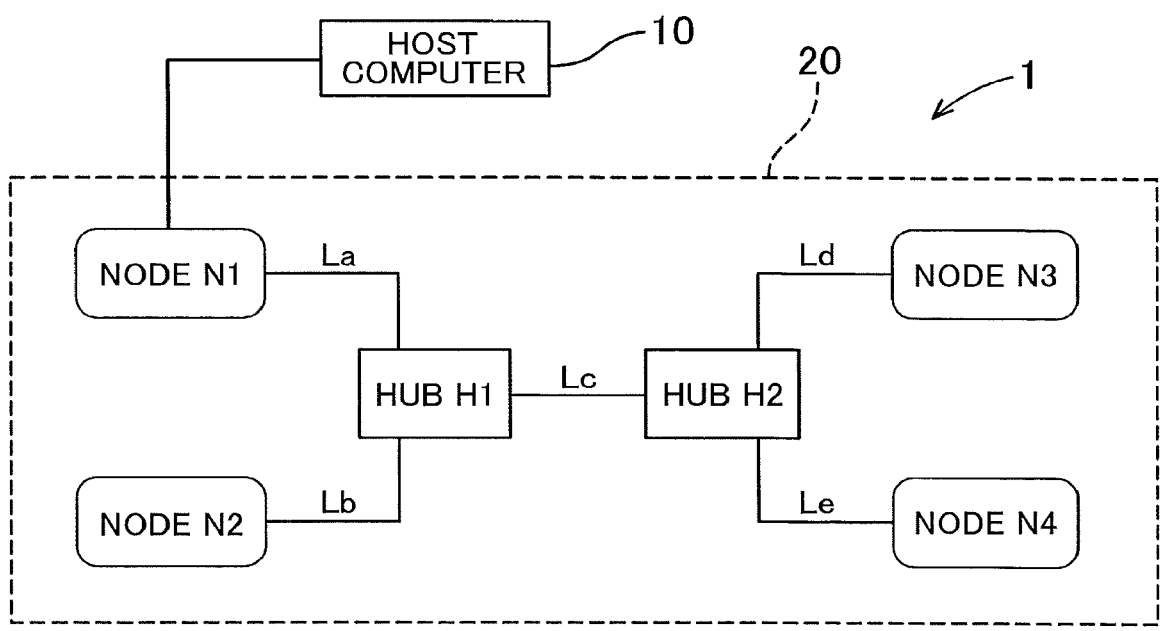
FIG. 2 illustrates the communication network of FIG. 1 according to a first aspect.

In a first aspect, as illustrated in FIG. 2, the communication network 20 includes four communication processing nodes N1 to N4 (hereinafter referred to also as "nodes"), two relay devices H1 and H2 (hereinafter referred to also as "hubs"), and five communication lines La to Le (hereinafter referred to also as "cables"). The nodes N1 to N4 communicate with each other via the plurality of hubs H1 and H2 and the plurality of cables La to Le that conform to the FL-net.

In the communication network 20, the nodes N1 to N4 transfer the token in a determined order. In FIG. 2, the order of transfer of the token matches the order of the node number. That is, the order of transfer of the token is determined as node N1→node N2→node N3→node N4. The node with the largest node number (node N4) transfers the token to the node with the smallest node number (node N1) (node N4→node N1).

One of the nodes N1 to N4 that has the token can transmit data to the other nodes. In other words, each of the nodes N1 to N4 can transmit data to the other nodes in the case where the node has the token, and cannot transmit data in the case where the node does not have the token. For example, when the node N2 receives the token from the preceding node N1, the node N2 transmits data to the other nodes N1, N3, and N4 within a prescribed time since the reception, and sends the token received from the preceding node to the following node N3 when the prescribed time elapses.

In the case where the node N2 cannot receive the token because of some factor even if it is the timing for the node N2 to receive the token from the preceding node N1, however, the node N2 reissues a token, and transmits the reissued token to the following node N3. This process is referred to as a "token reissuing process". That is, the node N2 issues a new token, transmits necessary data to the other nodes N1, N3, and N4, and thereafter transmits the token to the node N3 that follows the node N2 in the prescribed order.

It is assumed that a communication error has occurred in the communication network 20 with the cable Lb, which connects the hub H1 and the node N2 to each other, brought into the disconnected state. The disconnected state is a state in which communication cannot be made via the cable Lb, and may be caused when one end of the cable Lb is detached from the hub H1 or when a port of the hub H1 to which the cable Lb is connected is closed, for example.

Figure 3A:
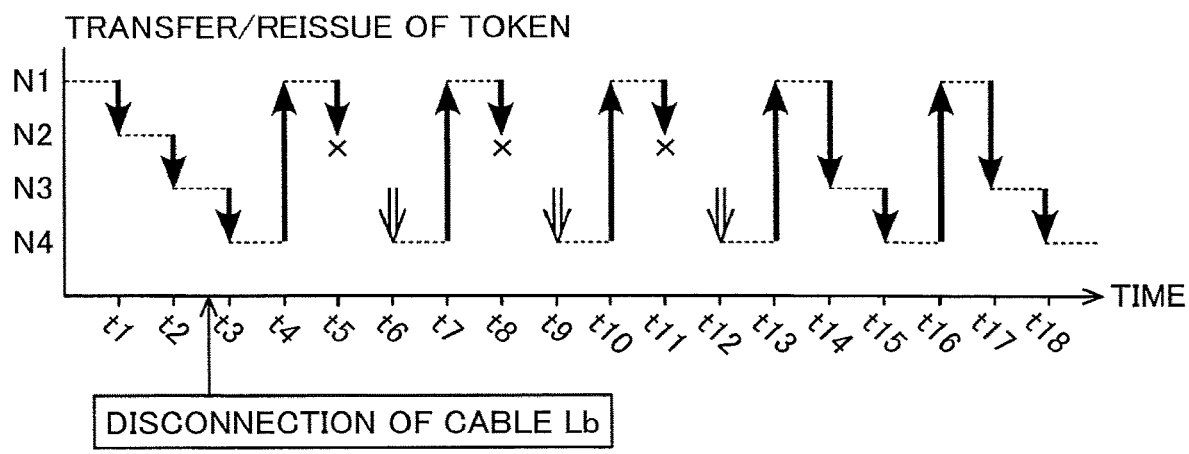
FIG. 3A is a time chart illustrating transfer of a token along with the lapse of time for a case where a communication line Lb is switched to a disconnected state in the configuration of FIG. 2.

As illustrated in FIG. 3A, the token is transferred from the node N1 to the following node N2 at time t1, and transferred from the node N2 to the following node N3 at time t2. In FIG. 3A, the thick arrows indicate that a token that has already been issued is transferred. It is assumed that the cable Lb is brought into the disconnected state immediately thereafter. The token is transferred from the node N3 to the following node N4 at time t3, and transferred from the node N4 to the following node N1 at time t4.

Subsequently, the token is transmitted from the node N1 to the following node N2 at time t5. However, the node N2 cannot receive the token from the preceding node N1 since the cable Lb is in the disconnected state. The node N2 has not received the token distributed through broadcasting by the other nodes N1, N3, and N4 for a certain period since the node N2 itself transmitted the token, recognizes that the node N2 itself has been removed from the communication network 20, and does not transmit a token or perform a token reissuing process.

With the cable Lb in the disconnected state, on the other hand, the node N3 cannot receive the token transmitted from the preceding node N2. Therefore, the node N3 transmits a reissued token to the following node N4 at time t6. In FIG. 3A, the double arrows indicate that the reissued token is transferred. Subsequently, the token is transferred from the node N4 to the following node N1 at time t7, and transfer of the token from the node N1 to the following node N2 is attempted at time t8.

Since the node N2 has been removed from the communication network 20 because of the disconnected state of the cable Lb, however, the node N2 cannot receive the token. Thus, the following node N3 executes a token reissuing process again at time t9. At times t10 to t12, processes that are the same as those at times t7 to t9 are performed. In this way, in the case where the node N2 does not transmit a token even after a token is repeatedly transmitted to the node N2 a prescribed number of times (in the embodiment, three times), the other nodes N1, N3, and N4 update the management table, considering that the node N2 has been removed from the communication network 20.

After that, the token is transferred from the node N4 to the following node N1 at time t13, and transferred from the node N1 to the following node N3 at time t14. After that (at and after time t15), normal communication is established on the assumption that the node N2 does not participate in the communication network 20. That is, a token reissuing process is not executed at and after time t15 unless a cable other than the cable Lb is brought into the disconnected state, for example.

Figure 3B:
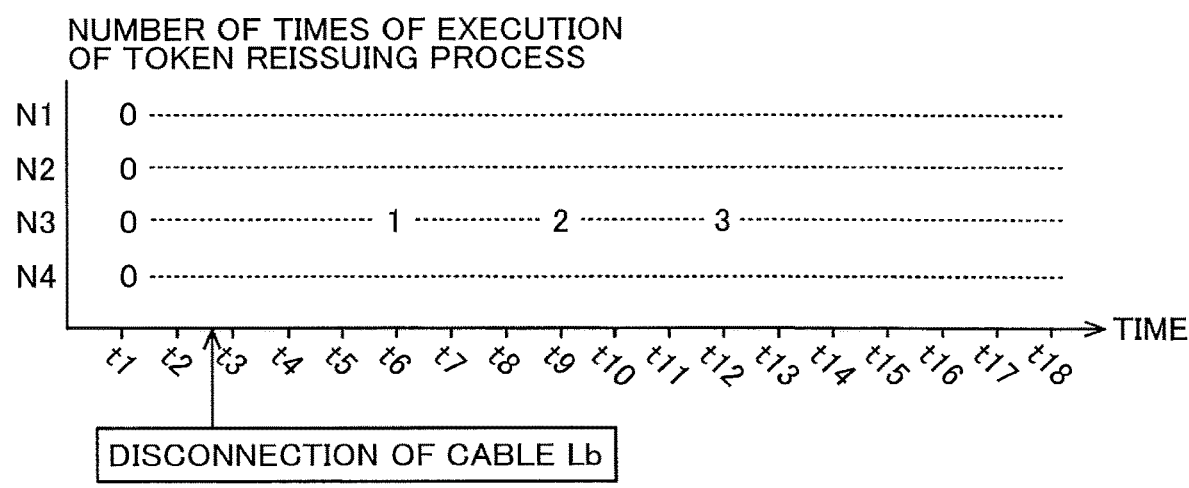
FIG. 3B indicates the number of times of execution of a token reissuing process in each communication processing node in the state of FIG. 3A.

The number of times of execution of the reissuing process by the nodes N1 to N4 in the case where the token is transferred or reissued as illustrated in FIG. 3A is indicated in FIG. 3B. That is, the number of times of execution of the reissuing process by the nodes N1, N2, and N4 with the cable Lb in the disconnected state is zero. Meanwhile, the number of times of execution of the reissuing process by the node N3 is three in total, at time t6, t9, and t12.

In the case where the disconnected state of the cable Lb is resolved thereafter, the node N2 receives a token distributed by the other nodes N1, N3, and N4 through broadcasting to apply for the participation in the communication network 20. Consequently, the node N2 acquires the second node number, which has been unoccupied in the communication network 20, to participate in the communication network 20 again. As a result, the communication network 20 returns to the state in which the nodes N1 to N4 can communicate with each other.

It is assumed that a communication error has occurred in the communication network 20 with the cable Lc, which connects the hub H1 and the hub H2 to each other, brought into the disconnected state. The disconnected state is a state in which communication cannot be made via the cable Lc, and may be caused when one end of the cable Lc is detached from the hub H1 or the hub H2 or when a port of the hub H1 or the hub H2 to which the cable Lc is connected is closed, for example.

Figure 4A:
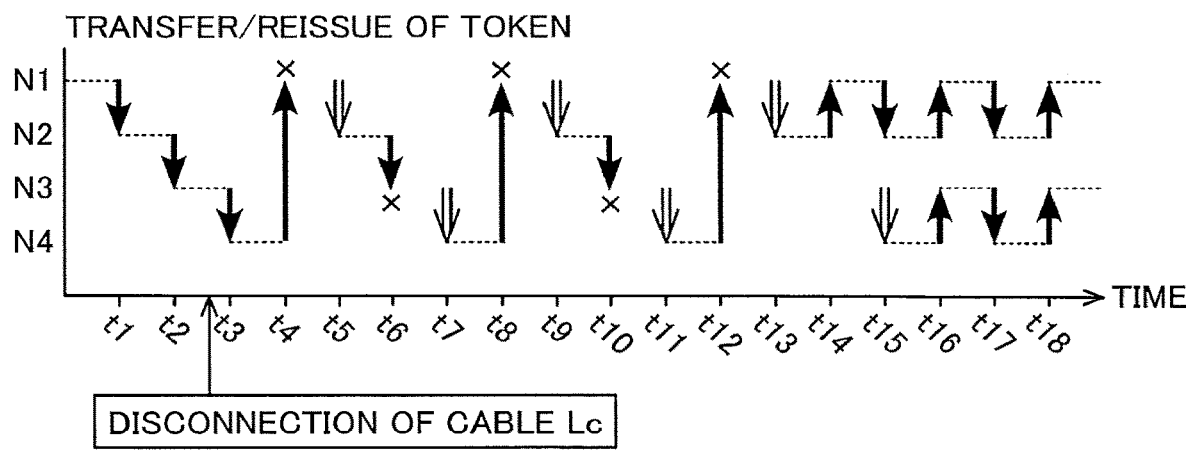
FIG. 4A is a time chart illustrating transfer of a token along with the lapse of time for a case where a communication line Lc is switched to a disconnected state in the configuration of FIG. 2.

As illustrated in FIG. 4A, the token is transferred from the node N1 to the following node N2 at time t1, and transferred from the node N2 to the following node N3 at time t2. In FIG. 4A, the thick arrows indicate that a token that has already been issued is transferred. It is assumed that the cable Lc is brought into the disconnected state immediately thereafter. The token is transferred from the node N3 to the following node N4 at time t3.

Subsequently, the token is transmitted from the node N4 to the following node N1 at time t4. Since the cable Lc is in the disconnected state, however, the node N1 cannot receive the token from the preceding node N4. The node N1 has received the token distributed through broadcasting by the other node N2 for a certain period since the node N1 itself transmitted the token, and at least recognizes that the node N2 participates in the communication network 20.

Thus, the node N1 transmits a reissued token to the following node N2 at time t5. In FIG. 4A, the double arrows indicate that the reissued token is transferred. Subsequently, transfer of the token from the node N2 to the following node N3 is attempted at time t6. Since the node N3 cannot communicate with the node N2 because of the disconnected state of the cable Lc, however, the node N3 cannot receive the token. After that, the node N1 cannot receive the token for a certain time, and therefore executes a token reissuing process again at time t9.

At times t10 to t13, processes that are the same as those at times t6 to t9 are performed. In this way, in the case where transmission of a token by the node N3 and the node N4 cannot be recognized even after a token is repeatedly transmitted to the node N3 by the node N2 a prescribed number of times (in the embodiment, three times), the nodes N1 and N2 update the management table, considering that the other nodes N3 and N4 have been removed from a part of the communication network 20 that the nodes N1 and N2 themselves constitute.

After that, the token is transferred from the node N2 to the following node N1 at time t14, and transferred from the node N1 to the following node N2 at time t15. After that (at and after time t16), normal communication is established on the assumption that the nodes N3 and N4 do not participate in a part of the communication network 20. That is, a token reissuing process is not executed by the nodes N1 and N2 at and after time t16 unless a cable other than the cable Lc is brought into the disconnected state, for example.

With the cable Lc in the disconnected state, on the other hand, the node N3 cannot receive the token transmitted from the preceding node N2. Therefore, the node N3 transmits a reissued token to the following node N4 at time t7. Subsequently, transfer of the token from the node N4 to the following node N1 is attempted at time t8.

Since the node N1 has been removed from a part of the communication network 20 that the nodes N3 and N4 constitute because of the disconnected state of the cable Lc, however, the node N1 cannot receive the token. The node N3 has received the token distributed through broadcasting by the other node N4 for a certain period since the node N3 itself transmitted the token, and at least recognizes that the node N4 participates in the communication network 20.

Thus, the node N3 transmits a reissued token to the following node N4 at time t11. Subsequently, transfer of the token from the node N4 to the following node N1 is attempted at time t12. Since the node N1 cannot communicate with the node N4 because of the disconnected state of the cable Lc, however, the node N1 cannot receive the token. After that, the node N3 cannot receive the token for a certain time, and therefore executes a token reissuing process again at time t15.

In this way, in the case where transmission of a token by the node N1 and the node N2 cannot be recognized even after a token is repeatedly transmitted to the node N1 by the node N4 a prescribed number of times (in the embodiment, three times), the nodes N3 and N4 update the management table, considering that the other nodes N1 and N2 have been removed from a part of the communication network 20 that the nodes N3 and N4 themselves constitute.

After that, the token is transferred from the node N4 to the following node N3 at time t16, and transferred from the node N3 to the following node N4 at time t17. After that (at and after time t18), normal communication is established on the assumption that the nodes N1 and N2 do not participate in a part of the communication network 20. That is, a token reissuing process is not executed by the nodes N3 and N4 at and after time t16 unless a cable other than the cable Lc is brought into the disconnected state, for example.

Figure 4B:
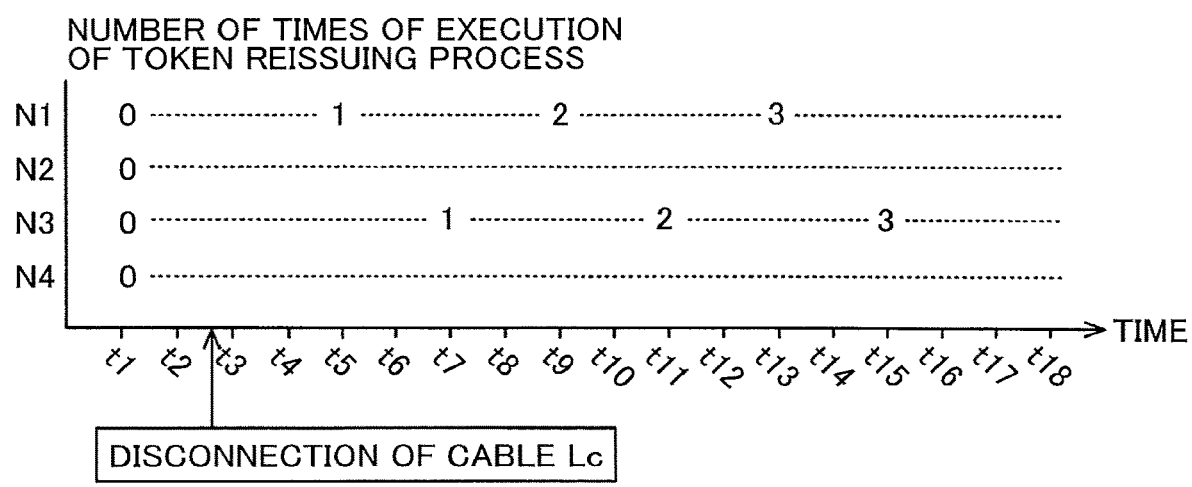
FIG. 4B indicates the number of times of execution of a token reissuing process in each communication processing node in the state of FIG. 4A.

The number of times of execution of the reissuing process by the nodes N1 to N4 in the case where the token is transferred or reissued as illustrated in FIG. 4A is indicated in FIG. 4B. That is, with the cable Lc in the disconnected state, the number of times of execution of the reissuing process by the node N1 is three in total, at time t5, t9, and t13. Meanwhile, the number of times of execution of the reissuing process by the nodes N2 and N4 is zero. Moreover, the number of times of execution of the reissuing process by the node N3 is three in total, at time t7, t11, and t15.

As described above, in the case where the cable Lc that connects the two hubs H1 and H2 to each other is in the disconnected state and there are two or more nodes on both sides across a portion in the disconnected state, a token reissuing process is executed over a prescribed number of times by a predetermined node, and communication is established in each of separated parts of the communication network 20.

In the case where the disconnected state of the cable Lc is resolved thereafter, one of the two tokens that are present in the communication network 20 disappears on the basis of the time of issue, for example. The nodes N3 and N4, for example, apply for the participation in a part of the communication network 20 constituted by the nodes N1 and N2. Consequently, the nodes N3 and N4 acquire the third and fourth node numbers, which have been unoccupied in a part of the communication network 20, to participate in the communication network 20 again. As a result, the communication network 20 returns to the state in which the nodes N1 to N4 can communicate with each other.

A system information generation process performed by the communication system 1 will be described. For the communication network 20 for communication through a token passing method, as described above, an increase or a decrease in number of nodes, such as participation of a new node and removal of the existing node, are allowed. In other words, the system (links between the nodes, the hubs, and the cables) of the communication network 20 is changed along with an increase or a decrease in number of nodes.

In order to adequately maintain or check such a communication network 20, accurate system information that indicates the actual system of the communication network 20 is required. Thus, as illustrated in FIG. 1, the communication system 1 includes the information acquisition unit 15 and the system information generation unit 16, and is configured to generate system information corresponding to the communication network 20.

Figure 6:
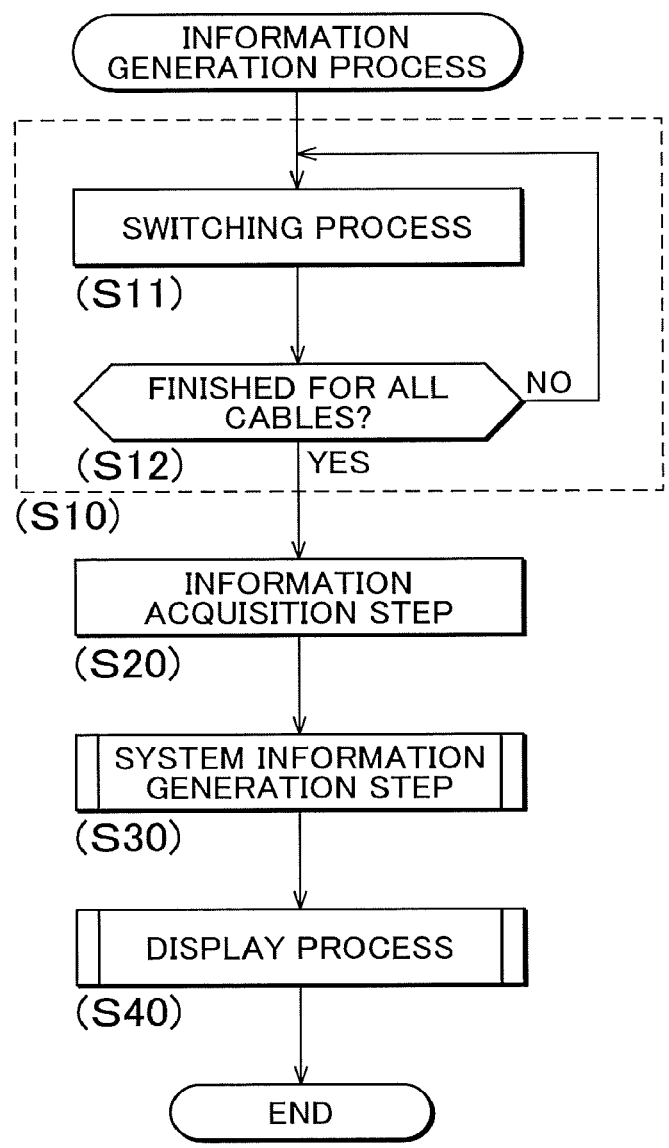
FIG. 6 is a flowchart illustrating an information generation process for generating system information on the communication network.

The communication network 20 is in the first aspect illustrated in FIG. 2. In the system information generation process, as illustrated in FIG. 6, a switching step is executed (step 10 (hereinafter the term "step" is represented by "S")). Particularly, in the switching step (S10), a switching process in which only one of the cables of the communication network 20 is switched to the disconnected state is first executed (S11).

In the embodiment, the switching process (S11) is executed by a worker by detaching one end of one of the cables La to Le from a port of one of the hubs H1 and H2. The one end of the one of the cables La to Le, which has been detached, is connected to the original port of the one of the hubs H1 and H2 again after the lapse of a predetermined time. Consequently, the nodes N1 to N4 execute a token reissuing process as necessary, and record information related to the execution of the reissuing process.

In the switching process (S11), at least a time required to establish normal communication corresponding to the communication network 20 in which a disconnected state has occurred is secured for the predetermined time for which the disconnected state is maintained. That is, the predetermined time is set to be longer than the time since switching to the disconnected state until none of the nodes N1 to N4 executes a token reissuing process any more.

The switching process (S11) is performed in accordance with an operation by the worker, and it is determined whether or not the switching process (S11) has been performed once each for all of the cables La to Le (S12). In the case where the switching process (S11) has not been executed for the number (five) of all of the cables La to Le (S12: No), the switching process (S11) is repeated. In the case where the switching process (S11) has been executed five times (S12: Yes), the switching step (S10) is finished. Consequently, the communication network 20 is returned to the state in which the nodes N1 to N4 can communicate with each other.

Next, the information acquisition unit 15 executes an information acquisition step (S20) in which node information I1 to I5 is acquired for the five switching processes (S11). Specifically, the information acquisition unit 15 acquires node information I1 to I5, which indicates whether or not a reissuing process is executed by the nodes N1 to N4, for the plurality of switching processes (S11) in the case where the switching process (S11), in which only one of the cables La to Le is switched to the disconnected state, has been executed once each for all of the cables La to Le through the switching step (S10).

That is, the information acquisition unit 15 acquires the node information I1 to I5 for the five switching processes (S11), which have been executed in correspondence with the five cables La to Le, as illustrated in FIG. 5A. In the embodiment, the node information I1 to I5 for the plurality of switching processes includes the number of times of execution of the reissuing process for the nodes N1 to N4 during execution of the switching process (S11).

Particularly, the information acquisition unit 15 acquires information related to the execution of the reissuing process recorded in each of the nodes N1 to N4 when the communication network 20 is returned from the disconnected state to a state in which all of the nodes N1 to N4 can communicate with each other. The information acquisition unit 15 recognizes the period for which the switching process (S11) was executed on the basis of the time when the reissuing process was executed, and generates the node information I1 to I5 for each switching process (S11).

In the case where the number of times of execution of the reissuing process has not reached a prescribed number of times determined in the FL-net communication protocol, the reissuing process is treated as having been caused by a factor other than the switching process (S11). Consequently, it is possible to treat the reissuing process that was executed because of some other factor as noise in the period in which the switching process (S11) is executed a plurality of times.

Figure 7:
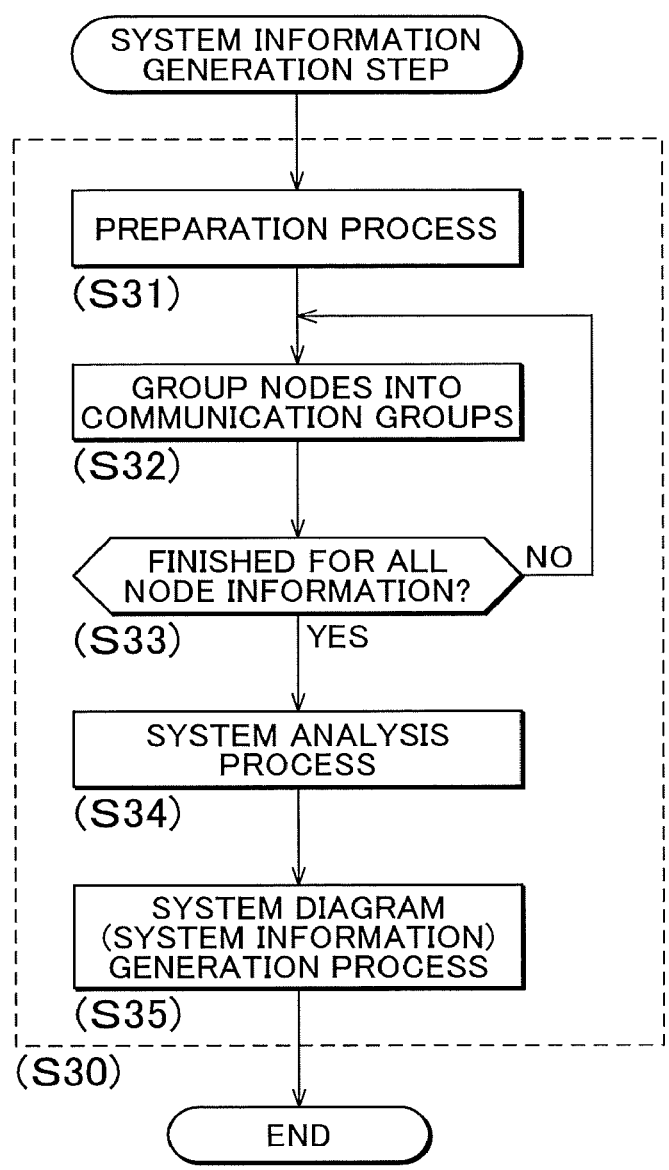
FIG. 7 is a flowchart illustrating a system information generation step of FIG. 6.

Subsequently, the system information generation unit 16 executes a system information generation step (S30), in which system information that indicates the system of the communication network 20 is generated, on the basis of a plurality of pieces of the node information I1 to I5 that have been acquired. Particularly, as illustrated in FIG. 7, the system information generation unit 16 first executes a preparation process (S31). In the preparation process (S31), a number Vn of the nodes N1 to N4, a number Vh of the hubs H1 and H2, and a number Vc of the cables La to Le in the communication network 20 are acquired.

The number Vn of the nodes N1 to N4 has a known value managed in the host computer 10. In the case where the number Vn of the nodes N1 to N4 is unknown, the worker may input the number Vn via the input device 11, for example. The number Vc of the cables La to Le corresponds to the number of times of execution of the switching process (S11), that is, the number of pieces of the node information I1 to I5, and therefore is acquired through execution of the information acquisition step (S20).

The number Vh of the hubs H1 and H2 is a number (Vc−Vn+1) obtained by adding one to the difference (Vc−Vn) between the number Vc of the cables La to Le and the number Vn of the nodes N1 to N4, because the hubs H1 and H2 are connected to each other by cables, the number of which is the number Vc of the cables La to Le minus the number Vn of the nodes N1 to N4. In the preparation process (S31), in addition, processes that match a variety of aspects of the communication network 20 are performed. Such processes will be discussed in detail later together with the other aspects (second to fifth aspects) of the communication network 20.

Next, in the embodiment, in generating system information, as illustrated in FIG. 5B, the system information generation unit 16 groups all of the communication processing nodes N1 to N4 into a first communication group G1 and a second communication group G2 on the basis of the node information I1 to I5 (S32). The first communication group G1 and the second communication group G2 are constituted of some of the nodes N1 to N4 that can communicate with each other during execution of the switching process (S11) and one of the nodes N1 to N4 that has been removed from the communication network 20, respectively.

Specifically, for the switching process (S11) in which the cable Lb is brought into the disconnected state, for example, the node N3 has executed a token reissuing process a plurality of times as indicated by the node information I2 illustrated in FIG. 5A, and therefore the system information generation unit 16 first determines that the node N3 constitutes the first communication group G1. Next, since the node N2 that precedes the node N3 belongs to a different communication group, the system information generation unit 16 determines that the node N2 constitutes the second communication group G2.

Subsequently, the system information generation unit 16 determines that the nodes N4 and N1, to which the token is sequentially transferred from the node N3, constitute the first communication group G1, which is the same as the node N3. Hence, in the switching process (S11) in which the cable Lb is brought into the disconnected state, as illustrated in FIG. 5C, the first communication group G1 is constituted of the nodes N1, N3, and N4 that can communicate with each other, and the second communication group G2 is constituted of the node N2 that has been removed from the communication network 20.

For the switching process (S11) in which the cable Lc is brought into the disconnected state, for example, the system information generation unit 16 groups the nodes N1 to N4 in the same manner as described above on the basis of the node information I3. Consequently, in the switching process (S11) in which the cable Lc is brought into the disconnected state, as illustrated in FIG. 5C, the first communication group G1 is constituted of the nodes N1 and N2 that can communicate with each other, and the second communication group G2 is constituted of the nodes N3 and N4 that can communicate with each other.

In the case where the grouping into communication groups (S32) has not been executed for all of the switching processes (S11) (S33: No), the system information generation unit 16 repeats the grouping into communication groups. In the case where the grouping into communication groups (S32) has been executed for all of the switching processes (S11) (S33: Yes), meanwhile, the system information generation unit 16 executes a system analysis process (S34) on the basis of the state of the first communication group G1 and the second communication group G2 corresponding to each of the node information I1 to I5.

Specifically, the system information generation unit 16 specifies that the communication line that connects the hubs H1 and H2 to each other, that is, the cable Lc, has been switched to the disconnected state in the switching process (S11) corresponding to the node information I3 in the case where independent communication has been established for each of the first communication group G1 and the second communication group G2 that have been separated on the basis of the predetermined node information I1 to I5 (in the first aspect, the node information I3).

In the case where a plurality of communication processing nodes are grouped into each of the first and second communication groups G1 and G2, a token reissuing process is executed as appropriate for each of the first and second communication groups G1 and G2, and independent communication is established for each of the first and second communication groups G1 and G2. Consequently, the system information generation unit 16 specifies that the communication line (cable Lc) that connects the hubs H1 and H2 to each other has been switched to the disconnected state in the switching process (S11) corresponding to the node information I3 with which two communication groups are established, among the plurality of pieces of the node information I1 to I5.

In the case where only one communication processing node is grouped into one of the first communication group G1 and the second communication group G2, the system information generation unit 16 specifies that a cable has been switched to the disconnected state such that the communication processing node is removed from one of the hubs H1 and H2. Further, the system information generation unit 16 calculates which of the nodes N1 to N4 are connected to the same one of the hubs H1 and H2 on the basis of the state of the nodes N1 to N4 grouped in correspondence with the node information I1 to I5, the number Vn of the nodes, and the number Vh of the hubs, and as a result, specifies the system of the communication network 20.

The system information generation unit 16 generates system information (S35) on the basis of the system of the communication network 20 specified through the analysis (S34) described above. The system information indicates the system of the communication network 20, and a variety of aspects may be adopted for the system information. Specifically, the system information may be a text that represents connection between the communication processing nodes and the relay devices and connection between the relay devices, or a system diagram such as that illustrated in FIG. 2.

Besides the aspect that clearly indicates the communication lines such as that illustrated in FIG. 2, the system diagram may be in a table form in which the communication lines are omitted such as that illustrated in FIG. 8, for example. In the system diagram of FIG. 8, the left column indicates the hubs H1 and H2, and the right column indicates nodes and hubs connected to the hub H1 or H2 in the left column via the communication lines.

As described above, the system information generated by the system information generation unit 16 is stored in the host computer 10. After that, as illustrated in FIG. 6, the communication system 1 executes a display process (S40) in which the system information is displayed on the display device 12 in response to a request from the worker, for example, and ends the generation process for the system information on the communication network 20.

The communication system 1 is constituted of the communication network 20 that enables three or more communication processing nodes N1 to N4 to communicate with each other through a token passing method. The communication processing nodes N1 to N4 are connected so as to be able to communicate with each other via two or more relay devices (hubs H1 and H2) and two or more communication lines (cables La to Le), and execute a reissuing process, in which a token is reissued for the following one of the communication processing nodes N1 to N4, in the case where one of the communication lines (cables La to Le) is brought into the disconnected state and a token is not received from the preceding one of the communication processing nodes N1 to N4.

The communication system 1 includes: the information acquisition unit 15 that acquires the node information I1 to I5, which indicates whether or not a reissuing process is executed by the communication processing nodes N1 to N4, for the plurality of switching processes (S11) in the case where the switching process (S11), in which only one of the communication lines (cables La to Le) is switched to the disconnected state, has been executed once each for all of the communication lines (cables La to Le); and the system information generation unit 16 that generates system information that indicates the system of the communication network 20 on the basis of the plurality of pieces of node information I1 to I5 that have been acquired.

An information generation method for the communication network 20 is applied to the communication network 20 that enables three or more communication processing nodes N1 to N4 to communicate with each other through a token passing method. The information generation method includes: the information acquisition step (S20) that includes acquiring the node information I1 to I5, which indicates whether or not a reissuing process is executed by the communication processing nodes N1 to N4, for the plurality of switching processes (S11) in the case where the switching process (S11), in which only one of the communication lines (cables La to Le) is switched to the disconnected state, has been executed once each for all of the communication lines (cables La to Le); and the system information generation step (S30) that includes generating system information that indicates the system of the communication network 20 on the basis of the plurality of pieces of node information I1 to I5 that have been acquired.

In the communication network 20 that adopts a token passing method, the token reissuing process is executed as appropriate by some of the communication processing nodes N1 to N4 in accordance with the order of transfer of the token in the communication network 20 and the system of the communication network 20. The communication system 1 and the information generation method for the communication network specify the system of the communication network 20 utilizing such properties of the communication network 20.

With the configuration of the embodiment described above, it is possible to calculate the number Vh of the hubs H1 and H2 and the number Vc of the cables La to Le that constitute the current communication network 20 and the relationship of connection between the nodes N1 to N4 and the hubs H1 and H2. This makes it possible to accurately generate system information that indicates the system of the communication network 20. Consequently, it is possible to improve the efficiency of the work for generating system information compared to the work for generating system information by following the communication lines (cables La to Le) of the actual communication network 20, for example. Hence, even in the case of a change in configuration of the communication network 20 such as an increase or a decrease in number of processing devices that are communication processing nodes, for example, system information after the change can be acquired easily. In addition, acquisition of the system information can aid appropriate maintenance or check of the communication network 20.

The system information generation unit 16 groups all of the communication processing nodes N1 to N4 into a first communication group G1 and a second communication group G2 on the basis of the node information I1 to I5 (S32). The first communication group G1 and the second communication group G2 are constituted of some of the communication processing nodes N1 to N4 that can communicate with each other during execution of the switching process (S11) and one of the communication processing nodes N1 to N4 that has been removed from the communication network 20, respectively.

With such a configuration, in the case where a plurality of the communication processing nodes N1 to N4 are grouped into each of the first communication group G1 and the second communication group G2, the system information generation unit 16 can specify that the one of the communication lines (cables La to Le) that has been brought into the disconnected state in the switching process (S11) couples the relay devices (hubs H1 and H2) to each other. In the case where one of the communication processing nodes N1 to N4 that has been removed from the communication network 20 is grouped into one of the first communication group G1 and the second communication group G2, meanwhile, the system information generation unit 16 can specify that the one of the communication lines (cables La to Le) that has been brought into the disconnected state in the switching process (S11) couples the one of the communication processing nodes N1 to N4 that has been removed and the relay device (hub H1 or H2) to which the other communication processing nodes are coupled to each other.

In the case where mutual communication has been established for each of the first communication group G1 and the second communication group G2 that have been separated on the basis of the predetermined node information I1 to I5, the system information generation unit 16 specifies the system of the communication network 20, considering that a communication line (cable Lc) that connects the relay devices (hubs H1 and H2) to each other has been switched to the disconnected state in the switching process (S11) corresponding to the node information I1 to I5.

Consequently, the system information generation unit 16 can specify that the communication line (cable Lc) that connects the relay devices (hubs H1 and H2) to each other has been switched to the disconnected state in the switching process (S11) corresponding to the node information I3 with which the two communication groups described above are established, among the plurality of pieces of the node information I1 to I5. The system information generation unit 16 can specify that one of all of the cables La to Le connects the hubs H1 and H2 to each other and the rest connect one of the hubs H1 and H2 and one of the nodes N1 to N4 to each other on the basis of the number Vn of the nodes N1 to N4, the number Vh of the hubs H1 and H2, and the number Vc of the cables La to Le. That is, the system information generation unit 16 can specify that the one of the communication lines (cables La, Lb, Ld, and Le) brought into the disconnected state in the switching process (S11) corresponding to the node information I1, I2, I4, and I5 other than the node information I3 with which two communication groups are established couples the one of the communication processing nodes N1 to N4 that has been removed and the relay device (hub H1 or H2) to which the other communication processing nodes are coupled to each other.

The node information I1 to I5 includes the number of times of execution of the reissuing process by the nodes N1 to N4 during execution of the switching process (S11).

With such a configuration, the reissuing process that was executed because of another factor can be treated as noise by comparing the number of times of execution of the token reissuing process in the node information I1 to I5 and a prescribed number of times (in the embodiment, three times) determined in the communication protocol. This makes it possible to accurately specify the system of the communication network 20.

The communication network 20 is an FL-net.

With such a configuration, the communication processing nodes N1 to N4 can be assumed to operate in accordance with the FL-net communication protocol, and thus the system information generation unit 16 can more reliably generate system information on the basis of the node information I1 to I5. In the communication network 20 that adopts the FL-net, in addition, it is not required to reset the communication processing nodes N1 to N4 in the case where the communication processing nodes N1 to N4 are removed from or added to the communication network 20. Therefore, the switching process (S11) can be executed more easily, which improves the efficiency of the work for generating system information.

In the FL-net, the degree of freedom in participation and removal of the communication processing nodes N1 to N4 is high as described above. Therefore, the number of processing devices in the communication network 20 can be increased or decreased easily, and there tends to be a difference between system information for management and the actual system of the communication network 20. Therefore, application of the present invention to the communication network 20 that adopts the FL-net is particularly useful.

The system information generation unit 16 generates a system diagram that illustrates the system of the communication network 20 as the system information.

With such a configuration, system information on the communication network 20 is generated as a system diagram by the system information generation unit 16 (see FIG. 2). Consequently, the manager of the communication network 20 can recognize the system of the communication network 20 with the system diagram through visual observation. Hence, the ease of management of the communication network 20 is improved, which can aid appropriate maintenance or check of the communication network 20 after a change such as an increase or a decrease in number of processing devices that are the communication processing nodes N1 to N4.

Figure 9:
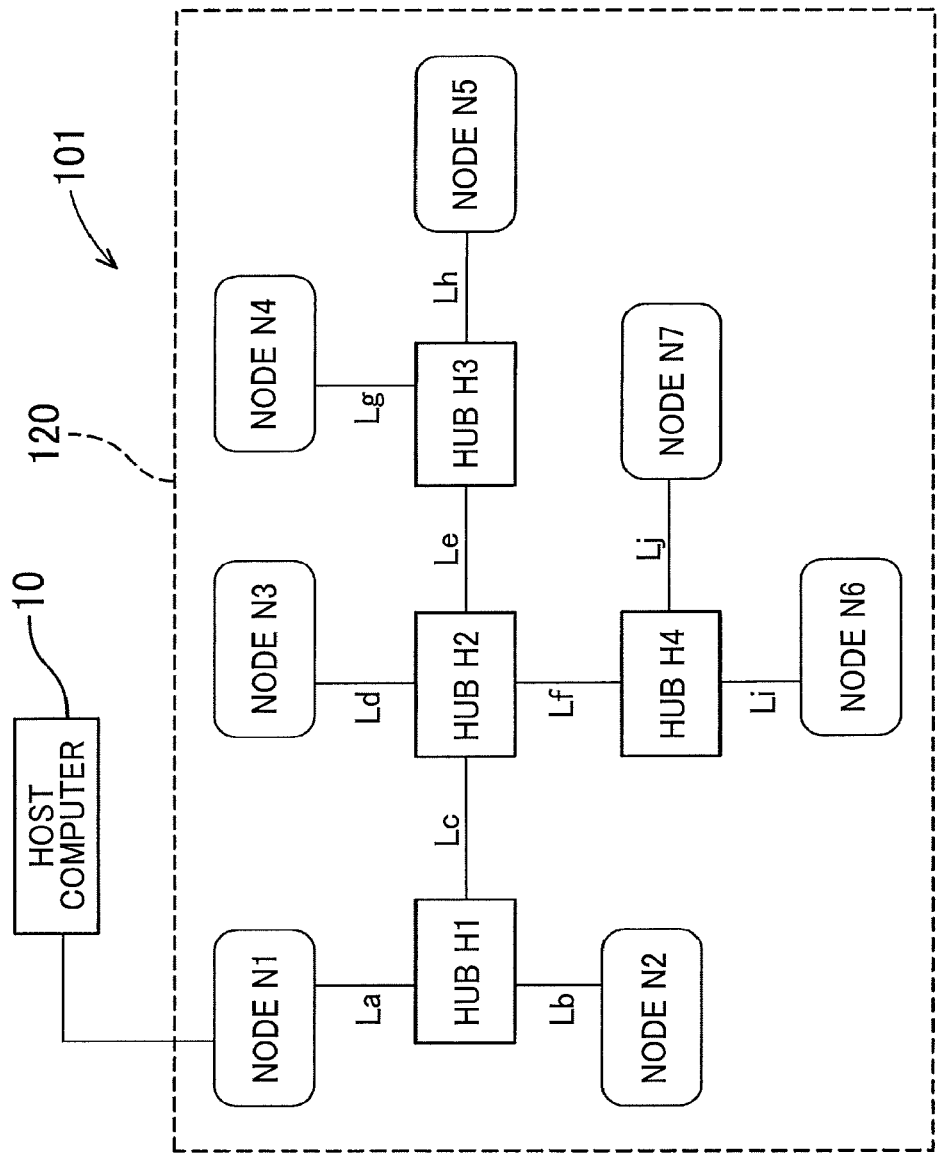
FIG. 9 illustrates a second aspect of the communication network of FIG. 1.

Next, a generation process for system information for a communication network according to another aspect will be described. As illustrated in FIG. 9, a communication network 120 as a second aspect includes seven nodes N1 to N7, four hubs H1 to H4, and ten cables La to Lj. When the switching step (S10) is executed for the communication network 120, in the information acquisition step (S20), as illustrated in FIG. 10A, the information acquisition unit 15 acquires node information I1 to I10 for the ten switching processes (S11), which have been executed in correspondence with the ten cables La to Lj.

Figure 10B:
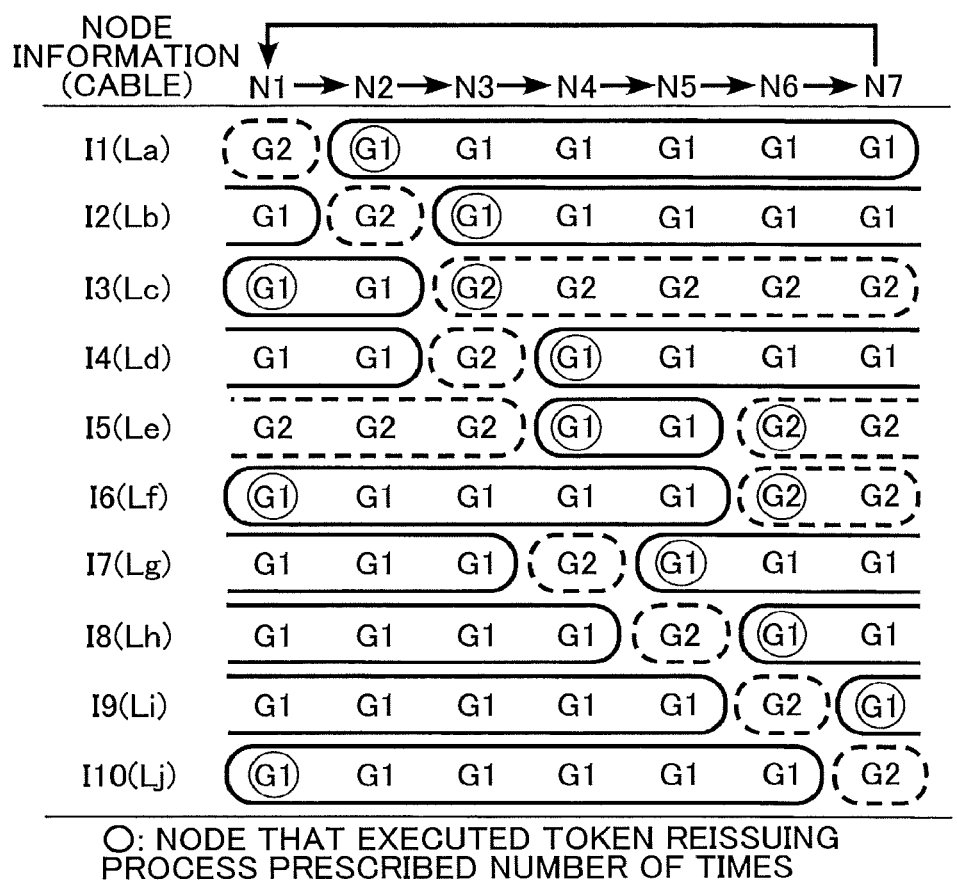
FIG. 10B illustrates a state in which communication processing nodes are grouped into two communication groups in correspondence with the node information of FIG. 10A.

In the preparation process (S31) of the system information generation step (S30), the system information generation unit 16 acquires the number Vn (seven) of the nodes, the number Vc (ten) of the cables, and the number Vh (four) of the hubs on the basis of the acquired node information I1 to I10. In addition, the system information generation unit 16 groups the nodes N1 to N7 into the first communication group G1 and the second communication group G2 for each of the ten switching processes (S11) as illustrated in FIGS. 10B and 10C.

In the case where the communication network 120 has four or more hubs H1 to H4 as in the second aspect, there may be a plurality of types of connection between the hubs H1 to H4, such as one in which the hubs are linearly connected by communication lines and one in which the hubs are connected in a plurality of rows with a branch. In the case where the communication network 120 has four hubs H1 to H4 as in the second aspect, there are two types of connection.

Thus, in the system analysis process (S34), the system information generation unit 16 specifies the type of connection between the hubs. For example, the system information generation unit 16 discriminates which of the two types of connection is used on the basis of the node information (in the second aspect, the node information I3, I5, and I6) for which independent communication is established for each of the first communication group G1 and the second communication group G2.

With reference to the nodes N1 and N2 that constitute the same first communication group G1 in the node information I3, the nodes N3, N6, and N7 have been added to the nodes N1 and N2 in the second communication group G2 in the node information I5. Meanwhile, the nodes N3, N4, and N5 have been added to the nodes N1 and N2 in the first communication group G1 in the node information I6.

Such addition of N6 and N7 to the same communication group as the nodes N1 and N2, which serve as the reference, in the node information I5 and the subsequent removal of N6 and N7 from the same communication group in the different node information I6 indicates the type of connection in which the four or more hubs are connected to each other with a branch. In the case where the hubs are linearly connected to each other, other nodes are sequentially added to the same communication group as the nodes N1 and N2, which serve as the reference, in each node information.

The system information generation unit 16 specifies the type of connection between the hubs as described above, and specifies the system of the communication network 120 in the same manner as in the first aspect. The other processes are the same as those according to the first aspect of the communication network 20, and will not be described in detail.

Figure 11:
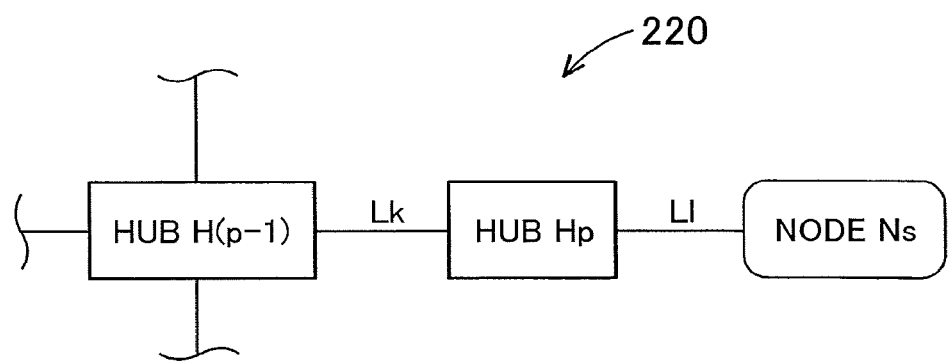
FIG. 11 illustrates a part of a third aspect of the communication network of FIG. 1.

A communication network 220 as a third aspect has a hub Hp to which only one node Ns is connected as partially illustrated in FIG. 11. The hub Hp is connected to another hub H(p-1) via a cable Lk, and connected to the node Ns via a cable Ll. When the switching step (S10) is executed for the communication network 220, in the information acquisition step (S20), as illustrated in FIG. 12A, the information acquisition unit 15 acquires node information Ik, Il for the switching processes (S11), which have been executed in correspondence with the cables Lk and Ll.

In the communication network 220, the node Ns is removed from the communication network 220 if any of the cables Lk and Ll is brought into the disconnected state. Therefore, the node information Ik and Il has the same content indicating that three reissuing processes have been executed by the node N(s+1) that follows the node Ns as illustrated in FIG. 12A.

In the preparation process (S31) of the system information generation step (S30), the system information generation unit 16 acquires the number Vn of the nodes, the number Vc of the cables, and the number Vh of the hubs, and thereafter executes processes that match the aspect of the communication network 220. Specifically, in the case where there are a redundant number of the same results indicating that only one node Ns executed a token reissuing process, such as the node information Ik and Il, the system information generation unit 16 subtracts a number (R−1) that matches the redundant number R from the number Vc of the cables and the number Vh of the hubs that have been calculated.

Consequently, it is assumed that the hub Hp and the cable Ll are isolated from the communication network 220 so that the node Ns is directly connected to the hub H(p−1) via the cable Lk. Such a preparation process (S31) enables application of the system analysis process (S34) that is similar to that according to the first aspect. As illustrated in FIG. 12B, the node Ns is grouped into the second communication group G2, which has been removed, in the grouping (S32) into communication groups by the system information generation unit 16. The system information generation unit 16 executes the system analysis process (S34) to specify the system of the communication network 220.

Figure 13:
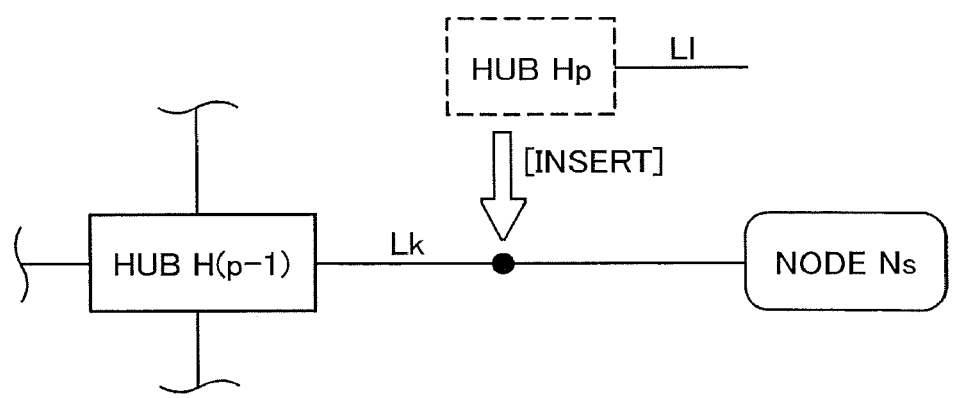
FIG. 13 illustrates a system information adjustment process corresponding to the configuration of FIG. 11.

In generating system information (S35), as illustrated in FIG. 13, the system information generation unit 16 inserts a number (R−1) of hubs Hp and cables Ll, the number matching the redundant number R, between the hub H(p−1) and the node Ns to adjust the generated system information.

Consequently, system information corresponding to the third aspect of the communication network 220 that has the hub Hp to which only one node Ns is connected is generated.

Figure 14:
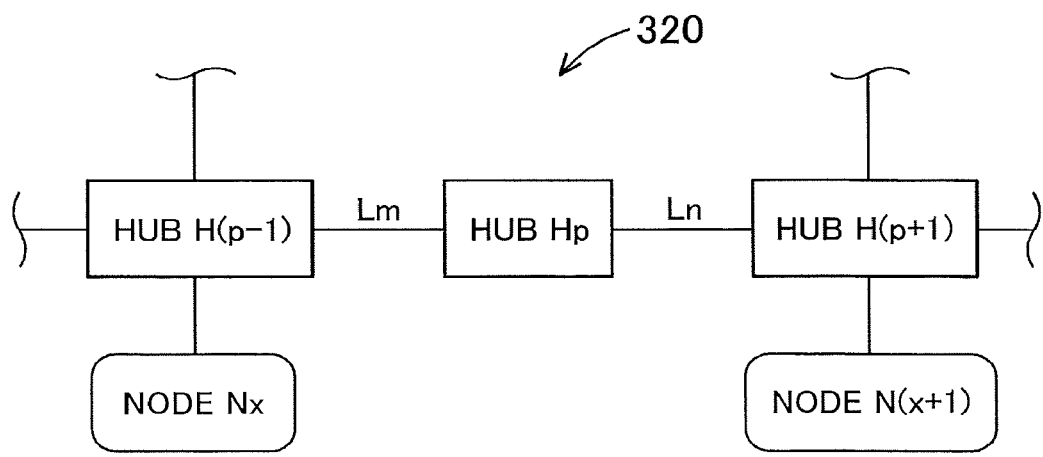
FIG. 14 illustrates a part of a fourth aspect of the communication network of FIG. 1.

As partially illustrated in FIG. 14, a communication network 320 as a fourth aspect has a hub Hp that is disposed between two hubs H(p−1) and H(p+1) and to which a node is not directly connected. The hub Hp is connected to the other hubs H(p−1) and H(p+1) via cables Lm and Ln, respectively. A plurality of nodes are directly or indirectly connected to the other hubs H(p−1) and H(p+1). In addition, a node Nx is connected to the hub H(p−1), and a node N(x+1) that follows the node Nx in node number is connected to the other hub H(p+1).

Figure 15:
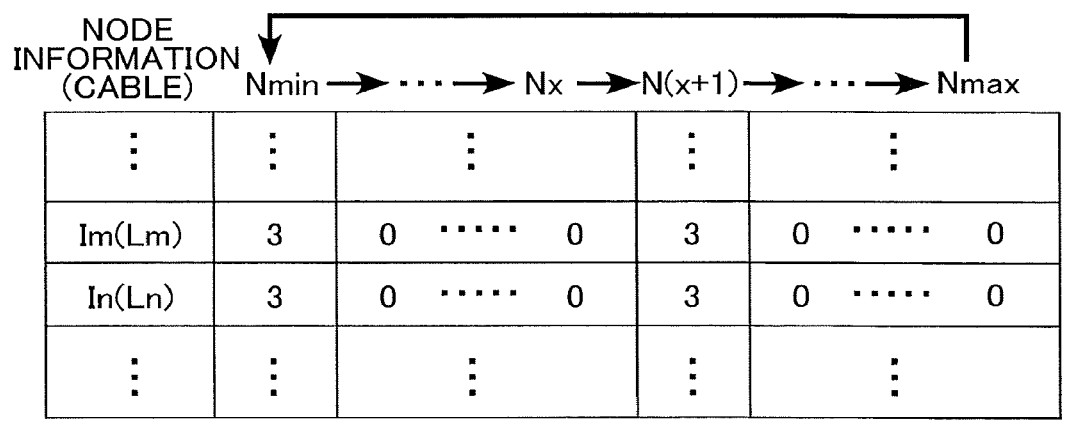
FIG. 15 illustrates a part of node information for each switching process in the configuration of FIG. 14.

When the switching step (S10) is executed for the communication network 320, in the information acquisition step (S20), as illustrated in FIG. 15, the information acquisition unit 15 acquires node information Im and In for the switching processes (S11), which have been executed in correspondence with the cables Lm and Ln. If any of the cables Lm and Ln is brought into the disconnected state in the communication network 320, a plurality of nodes (e.g. a node Nmin with the smallest node number) including the node N(x+1) execute a token reissuing process so that independent communication is established on both sides of the communication network 320 separated by the hub Hp. Therefore, the node information Im and In has the same content indicating that a token reissuing process has been executed in communication groups on both sides with respect to a predetermined node number as illustrated in FIG. 15.

In the preparation process (S31) of the system information generation step (S30), the system information generation unit 16 acquires the number Vn of the nodes, the number Vc of the cables, and the number Vh of the hubs, and thereafter executes processes that match the aspect of the communication network 320. Specifically, in the case where there are a redundant number of the same results indicating that a plurality of nodes executed a token reissuing process, such as the node information Im and In, the system information generation unit 16 subtracts a number (R−1) that matches the redundant number R from the number Vc of the cables and the number Vh of the hubs that have been calculated.

Consequently, it is assumed that the hub Hp and the cable Ln are isolated from the communication network 320 so that the hubs H(p−1) and H(p+1) are directly connected to each other via the cable Lm. Such a preparation process (S31) enables application of the system analysis process (S34) that is similar to that according to the first aspect. The system information generation unit 16 executes the system analysis process (S34) to specify the system of the communication network 320.

Figure 16:
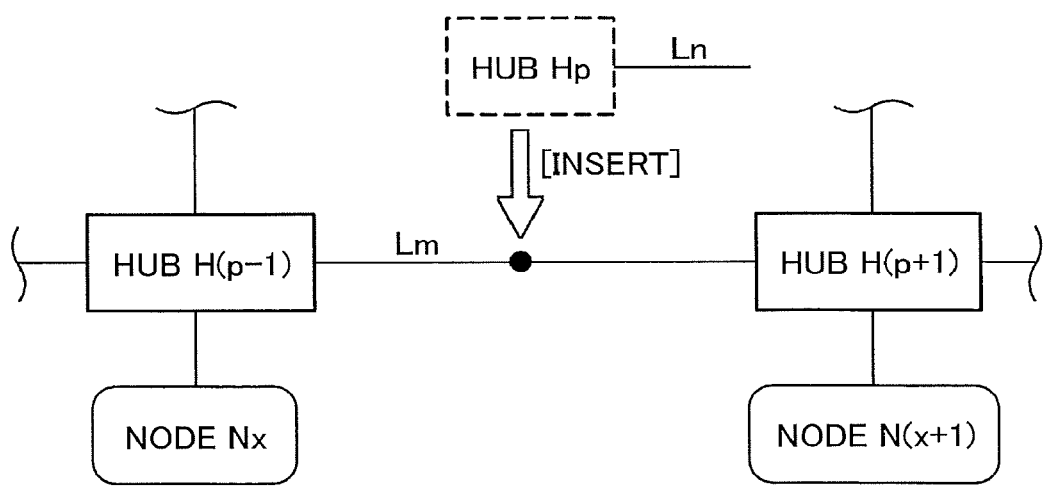
FIG. 16 illustrates a system information adjustment process corresponding to the configuration of FIG. 14.

In generating system information (S35), as illustrated in FIG. 16, the system information generation unit 16 inserts a number (R−1) of hubs Hp and cables Ln, the number matching the redundant number R, between the hub H(p−1) and the hub H(p+1) to adjust the generated system information. Consequently, system information corresponding to the fourth aspect of the communication network 320 that has the hub Hp that is disposed between the two hubs H(p−1) and H(p+1) and to which a node is not directly connected is generated.

Figure 17:
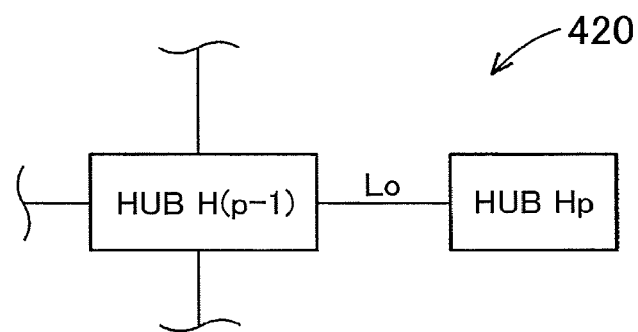
FIG. 17 illustrates a part of a fifth aspect of the communication network of FIG. 1.

As partially illustrated in FIG. 17, a communication network 420 as a fifth aspect has a hub Hp to which a node is not directly connected. The hub Hp is connected to the other hub H(p−1) via a cable Lo, but is not used in the communication network 420. A plurality of nodes are directly or indirectly connected to the other hub H(p−1).

Figure 18:
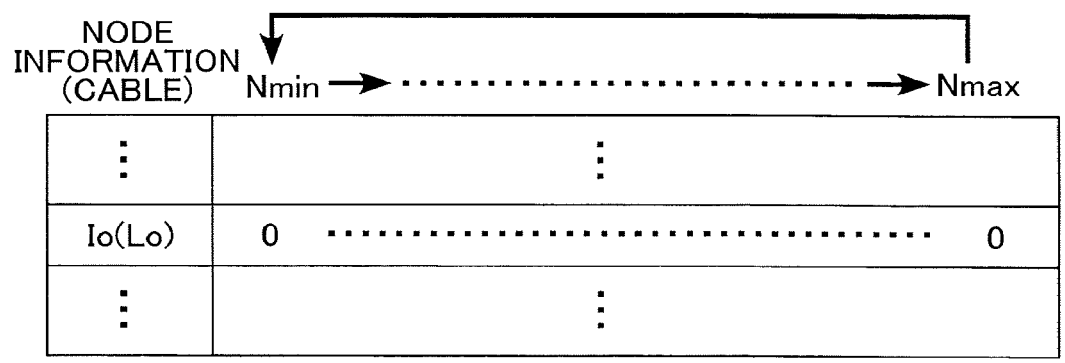
FIG. 18 illustrates a part of a state in which communication processing nodes are grouped into two communication groups in correspondence with the node information for each switching process in the configuration of FIG. 17.

When the switching step (S10) is executed for the communication network 420, in the information acquisition step (S20), as illustrated in FIG. 18, the information acquisition unit 15 acquires node information Io for the switching process (S11), which has been executed in correspondence with the cable Lo. Even if the cable Lo is brought into the disconnected state in the communication network 420, normal communication in the communication network 420 is maintained because no node or other hub is connected to the hub Hp. Therefore, as illustrated in FIG. 18, the node information Io indicates that a token reissuing process is not executed for any node.

In the preparation process (S31) of the system information generation step (S30), the system information generation unit 16 acquires the number Vn of the nodes, the number Vc of the cables, and the number Vh of the hubs, and thereafter executes processes that match the aspect of the communication network 420. Specifically, in the case where no node has executed a token reissuing process as indicated by the node information Io, the system information generation unit 16 subtracts a number U of unused hubs from the number Vc of the cables and the number Vh of the hubs that have been calculated.

Consequently, it is assumed that the hub Hp and the cable Lo have been isolated from the communication network 420. Such a preparation process (S31) enables application of the system analysis process (S34) that is similar to that according to the first aspect. The system information generation unit 16 executes the system analysis process (S34) to specify the system of the communication network 420.

In generating system information (S35), the system information generation unit 16 includes the presence of the number U of unused hubs in the system information. This is because, although the presence of the unused hub Hp can be recognized by the method indicated in the embodiment, it is not possible to specify which of the other hubs the unused hub Hp is connected to. In this way, system information corresponding to the fourth aspect of the communication network 420 that has the unused hub Hp is generated.

In the embodiment, the switching process (S11) is executed by the worker by detaching one end of one of the cables from a port of one of the hubs. In contrast, the switching process (S11) may be executed automatically, rather than by the detaching work by the worker.

Figure 19:
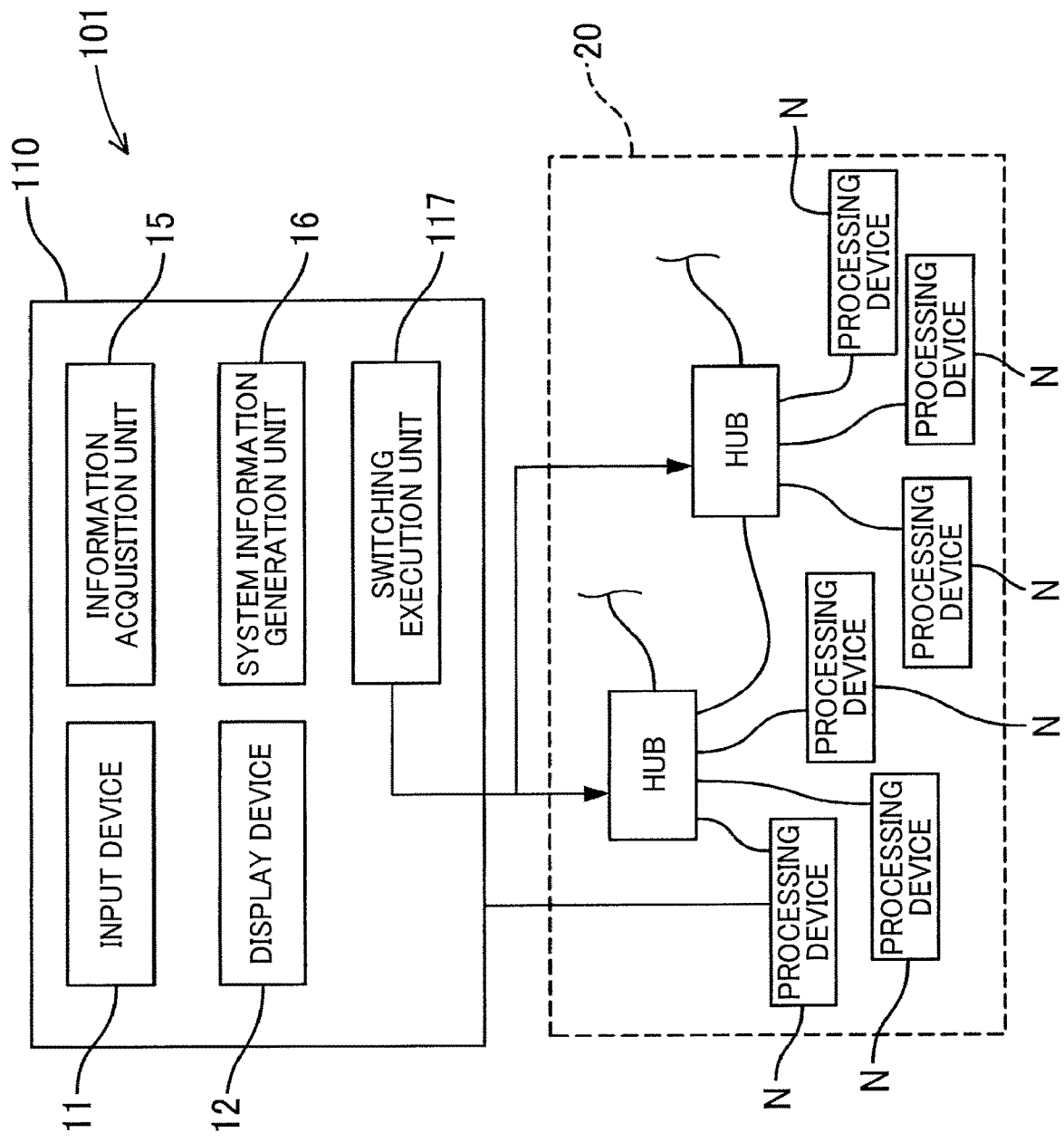
FIG. 19 illustrates the overall configuration of a communication system according to a modified aspect of the embodiment.

Specifically, the relay devices (hubs) have a function of switching whether a port to which a communication line is connected is open or closed on the basis of an instruction signal. As illustrated in FIG. 19, a host computer 110 of a communication system 101 includes a switching execution unit 117 that executes the switching process (S11) by sending an instruction signal to a hub to close a port to bring one of the cables into the disconnected state.

With such a configuration, the communication system 1 can sequentially execute the switching process (S11) automatically using the switching execution unit 117. Consequently, all of the communication lines can be reliably brought into the disconnected state once each, which can prevent one of the communication lines from being brought into the disconnected state twice or from being never brought into the disconnected state. Hence, the communication system 1 can generate more accurate system information. Since the switching process (S11) can be executed automatically, in addition, the efficiency of the work required for the switching process (S11) can be improved.

In the embodiment, the node information includes the number of times of execution of the token reissuing process by each of the nodes during execution of the switching process (S11). In contrast, the node information may be configured to include a management table for each communication processing node updated on the basis of the reissuing process of the communication processing node during execution of the switching process (S11), in place of or in addition to the number of times of execution of the reissuing process.

In the FL-net, as described above, each of the communication processing nodes N1 to N4 in the communication network 20 according to the first aspect recognizes the other communication processing nodes that participate in the communication network 20 (including a part of the communication network 20), in which the communication processing node itself participates, on the basis of a management table. For example, management tables for the communication processing node N1 at times T0 and Ta to Te are illustrated in FIG. 20A. Time T0 is any time before execution of the switching process, and times Ta to Te correspond to the times of execution of five switching processes (S11) in which the node information I1 to I5 is acquired.

The management tables serve as information that is changed by the token reissuing process by the communication processing nodes N1 to N4 during execution of the switching process (S11), and that indicates the communication processing nodes N1 to N4 that participate in the communication network 20 in which normal communication is established. The management tables also serve as information that indicates one of the communication processing nodes N1 to N4 that has been removed in the switching process (S11).

Specifically, the management tables for the communication processing node N1 at times T0 and Ta to Te can specify the state of the communication network 20 as illustrated in FIG. 20B. Hence, the system information generation unit 16 can generate system information on the communication network 20 by calculating the relationship of connection between the communication processing nodes N1 to N4 and the hubs H1 and H2 on the basis of the node information I1 to I5 that includes the management tables for the communication processing nodes N1 to N4 at times T0 and Ta to Te. Also with such a configuration, similarly, accurate system information can be generated.

Figure 21:
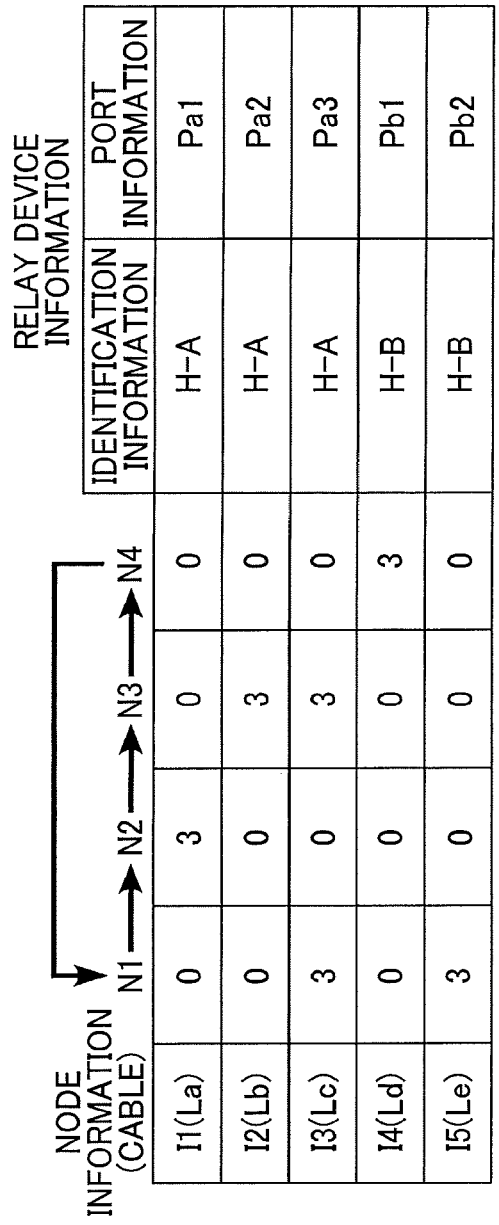
FIG. 21 illustrates a state in which the node information for each switching process in the configuration of FIG. 2 is associated with relay device information.

In the embodiment, the communication system 1 is configured such that each of the periods, for which the switching process (S11) was executed, is calculated on the basis of the node information acquired from each of the communication processing nodes to further specify the system of the communication network. In the communication system 1, in contrast, relay device information may be used to specify the system in addition to the node information. As illustrated in FIG. 21, the relay device information includes identification information that specifies a relay device to which a communication line brought into the disconnected state in the switching process (S11) is connected in the communication network, and port information that indicates a port to which the communication line that has been brought into the disconnected state is connected. Besides, the relay device information may include position information that indicates the position of installation of the relay device.

The information acquisition unit 15 acquires the relay device information, which has been input by the worker during execution of the switching process (S11), for example, in association with the node information. Then, the system information generation unit 16 generates system information that indicates the system of the communication network by specifying the time when the switching process (S11) was executed and the relay devices (H-A and H-B) and the ports (Pa1 to Pa3, Pb1, and Pb2) to which a communication line brought into the disconnected state was connected, on the basis of the plurality of pieces of node information and the relay device information that have been acquired.

With such a configuration, the system information generation unit 16 can complement the identification information and the port information on the communication processing nodes, which cannot be specified from only the node information I1 to I5, using the relay device information. Consequently, it is possible to discriminate which relay device in the actual communication network 20 a relay device in the system information corresponds to, and to generate system information that is consistent with the actual communication network 20. This makes it easy for the manager of the communication network 20 to perform maintenance, check, or the like on the basis of the system information with high consistency.

In the embodiment, the communication networks 20, 120, 220, 320, and 420 are each an FL-net. However, a different communication network may be adopted as long as the communication network enables communication through a token passing method. Such a configuration also achieves the same effect as that according to the embodiment.

What is claimed is:

1. A communication system constituted of a communication network that enables three or more communication processing nodes to communicate with each other through a token passing method, comprising:
    an information acquisition unit; and
    a system information generation unit, wherein:
    the communication processing nodes are connected so as to be able to communicate with each other via two or more relay devices and two or more communication lines, and are each configured such that the communication processing node executes a reissuing process, in which a token is reissued for a following one of the communication processing nodes, in a case where one of the communication lines is brought into a disconnected state and a token is not received from a preceding one of the communication processing nodes;
    the information acquisition unit is configured such that, in a case where a switching process, in which only one of the communication lines is switched to the disconnected state, has been executed once each for all of the communication lines, the information acquisition unit acquires node information that indicates whether or not the reissuing process is executed by each of the communication processing nodes for each of the plurality of switching processes;
    the system information generation unit is configured to generate system information that indicates a system of the communication network on the basis of a plurality of pieces of the node information that has been acquired;
    the system information generation unit is configured to group all of the communication processing nodes into one of a first communication group and a second communication group on the basis of the node information a number of times; and
    the number of times is the total number of all of the communication lines.

2. The communication system according to claim 1, wherein
    the first communication group and the second communication group are each constituted of a plurality of communication processing nodes that can communicate with each other during execution of the switching process or one of the communication processing nodes that has been removed from the communication network.

3. The communication system according to claim 2, wherein the system information generation unit is configured such that, in a case where mutual communication has been established in each of the first communication group and the second communication group that have been separated on the basis of predetermined node information, the system information generation unit specifies the system of the communication network, considering that a communication line that connects the relay devices to each other has been switched to the disconnected state in the switching process corresponding to the predetermined node information.

4. The communication system according to claim 1, wherein the node information includes a number of times of execution of the reissuing process by each of the communication processing nodes during execution of the switching process.

5. The communication system according to claim 1, wherein the communication network is an FL-net.

6. The communication system according to claim 5, wherein:
the each of the communication processing nodes has a management table that indicates the communication processing nodes that participate in the communication network; and
the node information includes the management table of each of the communication processing nodes, which has been updated on the basis of the reissuing process by the communication processing node during execution of the switching process.

7. The communication system according to claim 1, further comprising:
a switching execution unit that executes the switching process, wherein:
the relay devices are configured to switch whether a port to which a communication line is connected is open or closed on the basis of an instruction signal; and
the switching execution unit is configured to send the instruction signal to the relay devices to close the port to bring the communication line into the disconnected state.

8. The communication system according to claim 1, wherein the system information generation unit is configured to generate a system diagram that illustrates the system of the communication network as the system information.

9. The communication system according to claim 1, wherein:
the information acquisition unit is configured to acquire, in association with the node information, relay device information that specifies a relay device to which a communication line that has been brought into the disconnected state in the switching process is connected in the communication network; and
the system information generation unit is configured to generate the system information that indicates the system of the communication network on the basis of the plurality of pieces of node information and the relay device information that have been acquired.

10. An information generation method to be applied to a communication network over which three or more communication processing nodes can communicate with each other through a token passing method, comprising the steps of: acquiring information; and
generating system information, wherein:
the communication processing nodes are connected so as to be able to communicate with each other via two or more relay devices and two or more communication lines, and each of the communication processing nodes executes a reissuing process, in which a token is reissued for a following one of the communication processing nodes, in a case where one of the communication lines is brought into a disconnected state and a token is not received from a preceding one of the communication processing nodes;
the information acquisition step includes acquiring, in a case where a switching process, in which only one of the communication lines is switched to the disconnected state, has been executed once each for all of the communication lines, node information that indicates whether or not the reissuing process is executed by each of the communication processing nodes for each of the plurality of switching processes;
the system information generation step includes generating system information that indicates a system of the communication network on the basis of a plurality of pieces of the node information that has been acquired;
the system information generation step includes grouping all of the communication processing nodes into one of a first communication group and a second communication group, on the basis of the node information, a number of times; and
the number of times is the total number of all of the communication lines.

11. The communication system according to claim 1, wherein, in the switching process, the one of the communication lines is switched from a connected state to the disconnected state and back to the connected state.

12. The communication system according to claim 11, wherein, in the switching process, the one of the communication lines is switched to the disconnected state for at least a predetermined amount of time and then switched back to the connected state.

13. The communication system according to claim 12, wherein the predetermined amount of time includes an amount of time from when the one of the communication lines is switched to the disconnected state until the communication processing nodes no longer execute the reissuing process.

14. The communication system according to claim 7, wherein the switching execution unit is configured to send a plurality of the instruction signal to the relay devices to sequentially bring each of the communication lines connected thereto one-by-one into the disconnected state.

15. The information generation method according to claim 10, further comprising executing the switching process once each for all of the communication lines.

16. The information generation method according to claim 15, wherein, in the switching process, the one of the communication lines is switched from a connected state to the disconnected state and back to the connected state.

17. The information generation method according to claim 16, wherein, in the switching process, the one of the communication lines is switched to the disconnected state for at least a predetermined amount of time and then switched back to the connected state.

18. The information generation method according to claim 17, wherein the predetermined amount of time includes an amount of time from when the one of the communication lines is switched to the disconnected state until the communication processing nodes no longer execute the reissuing process.

19. The communication system according to claim 1, wherein a communication line is a direct connection between (1) a communication processing node or a relay device and (2) a communication processing node or a relay device with no communication processing node or relay device therebetween.

20. The communication system according to claim 19, wherein a number of the plurality of switching processes, in each of which only one of the communication lines is switched to the disconnected state, is the total number of all of the communication lines.

\* \* \* \* \*